Aug. 21, 1956 D. L. EVANS 2,759,394
GLARE SHIELD FOR SPECTACLE LENS
Filed Jan. 5, 1952

Inventor
David L. Evans,
by George H. Baldwin
His Attorney

United States Patent Office 2,759,394
Patented Aug. 21, 1956

2,759,394

GLARE SHIELD FOR SPECTACLE LENS

David L. Evans, Jacksonville, Fla.

Application January 5, 1952, Serial No. 265,120

1 Claim. (Cl. 88—41)

My invention relates to glare shields for spectacles lenses, and more particularly to a glare shield in the form of a sheet of selectively transparent material for attachment to a spectacle lens.

An object of my invention is to provide an improved glare shield for a spectacle lens in the form of a thin sheet of selectively transparent material readily applicable to and removable from a lens surface.

Another object of my invention is to provide a glare shield applicable by means of a pressure-sensitive adhesive to a spectacle lens wherein the optical clarity of the lens will be substantially unaffected.

Glare shields for spectacle lenses have been heretofore proposed which are to be applied by pressure-sensitive adhesive to the lens. It is an object of my invention to eliminate substantially all interference with clear vision in shields of this general character, to provide improved means for removing the shield from the lens, and to provide a shield useful with a wide number of differently powered lenses.

It is a further object to provide a glare shield of a type such that a minimum number of different sizes and shapes are required for appropriate fitting of the wide variety of spectacles or eyeglasses which exist.

Figure 1:
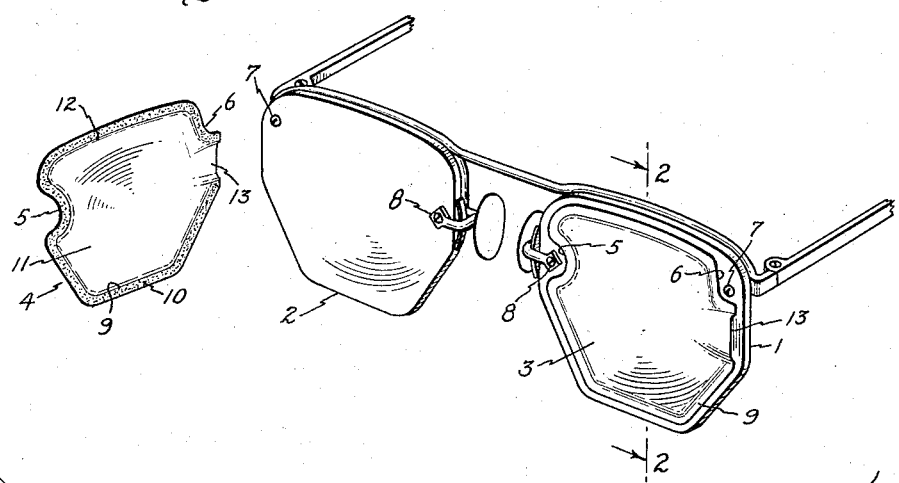
Figure 2:
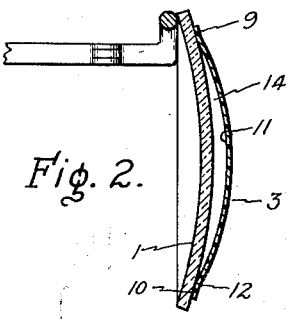

The novel features which I believe to be characteristic of my invention are set forth with particularity in the appended claim. My invention itself, however, both as to its organization and method of operation, together with further objects and advantages thereof, may best be understood by reference to the following description taken in connection with the accompanying drawing, in which Fig. 1 is an exploded view of a pair of spectacles as used with glare shields in accord with my invention; Fig. 2 is a sectional view taken along line 2—2 of Fig. 1 showing a lens with a glare shield applied thereto in accord with my invention; and Fig. 3 discloses a modified glare shield, as used with a lens of a pair of horn rimmed spectacles, in accord with my invention.

Turning now to Fig. 1 of the drawings, a conventional pair of rimless spectacles or eyeglasses comprising glass concavo-convex lenses 1 and 2 is shown with a glare shield 3 attached to the outer convex major surface of lens 1 and a second similar glare shield 4 detached from lens 2. The shields comprise thin sheets of selectively transparent material and have overall dimensions slightly smaller than those of the respective lens. Thus, as demonstrated by shield 3 attached to lens 1, the shield covers slightly less than the whole clear surface of the lens, preferably leaving a narrow margin of uncovered lens completely around the shield. This margin may be about one-sixteenth of an inch in width. Peripheral indentations 5 and 6, as best seen on shield 4, are preferably provided to avoid contact between the shield and any hinge or nosepiece attachments to the lens, such as at 7 and 8.

A suitable material for the shield members is tinted cellulose acetate, or celluloid, of between about .005 and .015 inch in thickness. Other materials which will, similarly, selectively block light of certain characteristics are suitable and among such other materials are sheets containing optically oriented light-polarizing crystals. Such materials generally, whether colored or tinted, having a gray or black cast, or having light-polarizing characteristics, and which selectively interfere with the passage of incident light, are herein included in the term "selectively transparent material."

The peripheral border portion 9 of the shield 3 is shaped to conform as nearly as possible to the curved lens surface, and this border portion only of the shield carries a thin coating of a pressure-sensitive, re-adhering adhesive 10. Suitable adhesives are Paisley Adhesive No. 2277, obtainable from Paisley Products, Inc., 1770 Canalport, Chicago, Illinois, or Arabol Adhesive No. E-668-B obtainable from the Arabol Manufacturing Company, 110 East Forty-second Street, New York, New York. These adhesives are supplied in the form of a milky liquid which may be applied thinly and as evenly as possible to the inside surface of the border portion 9 of the shield by means of a small brush or otherwise, and which will thereafter dry or set to a tacky, clear or slightly amber colored film. Of course, many other pressure-sensitive adhesives suitable for use in this invention are obtainable.

As stated before, the narrow border portion 9 of the shield is shaped to lie conformingly against the lens surface. The major central portion 11 of the shield, however, has a slightly greater curvature than that of the convex outer face of the lens to which it is applied. The division between the central major portion of the shield and the narrow border portion is represented in the drawings as a slight crease or bend 12. In practice, this crease may be very slight, imperceptible or missing entirely. In accord with the invention, it is necessary that a narrow border portion of the shield should lie conformingly against the lens surface, but if the lens curvature and shield curvature differ very little from one another, which is the preferred relationship, a border portion one-sixteenth inch wide will so nearly conform to the lens curvature that no crease 12 is required. The narrow border portion described herein will be not more than about one-eighth inch wide and not less than about one-thirty-second inch wide.

The smooth curvature of the border is unbroken except for a restricted upset portion 13. This upset portion provides, as best seen in Fig. 1, a small space between the edge of shield 3 and the lens surface, into which space a fingernail, or other small object, may be inserted to permit the removal of the shield by lifting it from the lens. Adhesive should be omitted from the upset portion.

If the shield of my invention is made of cellulose acetate or any material moldable when heated, any ordinary forming technique may be employed to mold it into the curved, concavo-convex shape desired.

By hand, a sheet of cellulose acetate may be heated to its softening temperature, which may be above the boiling point of water, for example, and stretched down over a convex mold having approximately a spherical curvature slightly greater than the curvature of the lens with which it is to be used. Upon cooling, the material has taken the appropriate spherical form. The mold should have a protrusion to upset the edge of the shield as at 13. After such hand forming, the shield is cut out of the formed part of the sheet in appropriate size and shape for the particular lens or style of lens with which it will be used.

The relationship between shield 3 and lens 1, to which it is applied, is clearly seen in the sectional view of Fig. 2. The border portion 9 of the shield outside of crease 12 is seen to have substantially the same curvature as the lens, and to lie conformingly against the lens, and this portion is adhered to the lens slightly inside of the outer periphery of the lens. The major portion 11 of the shield within the crease 12 has a curvature greater than that of the lens and is separated therefrom by an air space 14. The air space need be of no particular thickness, as measured perpendicular to the lens surface, but it should be less than one-tenth inch, if possible, and may be a few hundredths of an inch. Thus the shield is in contact with the lens only peripherally about the most used central portion of the lens with a resultant absence of interference with the clarity of normal vision, except for the selective filtering of the light passing through the shield. The border portion 9 of the shield, being coated on its inner side with adhesive, will be less clear due to collection of some dust on the tacky adhesive prior to application of the shield to the lens, such dust collecting being almost impossible to eliminate in practice, and due to slight variations in the thickness of the adhesive film and non-adherence of small sections to form air bubbles. According to the present invention, all such disturbing effects are relegated to the ordinarily unused peripheral portion of the lens, where, in actual practice, the effects are almost unnoticeable to the wearer.

Figure 3:
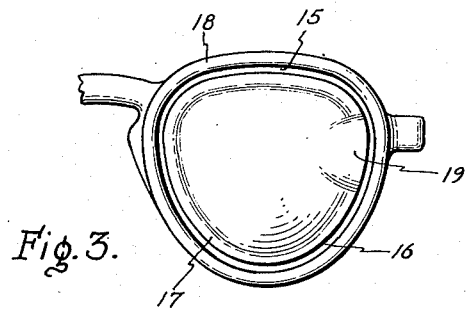

Fig. 3 discloses one lens 15 of a pair of rimmed spectacles, to which a shield 16 is applied in much the same manner as heretofore described, being attached thereto by a layer of pressure-sensitive adhesive coated on the lens engaging surface of border portion 17 of the shield. The outer periphery of the shield, that is, the outer edge of border portion 17, lies just inside the inner periphery of the rim 18. Thus the border portion 17 lies smoothly against the lens surface, being attached thereto by the adhesive, completely around the major, central, useful portion of the lens, except that a small upset portion 19 is provided, as before, to receive a fingernail between the lens and the edge of the shield. The major portion of the shield, which is surrounded by the border portion 17, has a greater curvature than that of the convex lens surface which it overlies to provide an air space similar to air space 14 of Fig. 2.

In practice, most eyeglass lenses have a spherically convex outer surface, or nearly so, and even though the curvature differs, a shield curved sufficiently to be applicable to the most curved lenses will be suitable for lenses having much less curvature. A shield of a particular outline configuration, accordingly, can be provided which will be suitable for substantially any eyeglasses having lenses of approximately that configuration, and it will not be found necessary to provide differently curved shields for the ordinarily encountered range of lens surface curvatures. It will also be noted that the outline configuration of the shield and lens need not match exactly, either as to shape or size, and a particular shield may be used on a lens substantially larger than the smallest which the particular shield would fit without producing an awkward appearance and with appreciable, though less than maximum, efficacy. It will be apparent, accordingly, that a relatively small number of different sizes and shapes of shields in accord with this invention are required to sufficiently accurately match a very large number of different sizes, styles and shapes of eyeglass. It is further to be noted that, regardless of relative size between shield and lens, the upset portion 13 is readily accessible and useable for removing the shield.

Thus different shapes and sizes of shields can be provided for use with various models and sizes of eyeglasses or spectacles as required, and while I have shown only certain preferred embodiments of my invention, I wish it to be understood that these are by way of illustration only and that many modifications will occur to those skilled in the art. I therefore wish to have it understood that I intend, in the appended claim, to cover all such modifications as fall within the true spirit and scope of my invention.

What I claim as new and desire to secure by Letters Patent of the United States is:

A glare shield for a concavo-convex lens, said shield comprising a thin, pre-formed, substantially non-stretchable self-supporting sheet of tinted transparent material having uniform thickness and of no greater overall plan dimensions than said lens, said sheet comprising a narrow peripheral border portion pre-formed into a predetermined concave shape to conform to the convex surface of said lens, the remaining central major portion of said sheet within the inner periphery of said border portion being curvably pre-formed to a concave curvature greater than the convex curvature of said convex lens surface, whereby said central major portion is out of contact with said convex lens surface when said border portion is in conforming contact with said convex lens surface within the periphery of said lens surface, a layer of pressure-sensitive adhesive on only the lens-engaging face of said border portion to removably adhere said sheet to said lens, and an upset portion of said border portion restricted in extent to lie within the peripheral boundaries of said sheet and pre-formed to stand upwardly out of the curved path established by the border portion sufficiently to accept a fingernail thereunder between said upset portion and said lens surface for the purpose of removing said sheet from lens, said upset portion providing by expansion latitude the exact curvature of said border portion to fit lenses of slightly differing convex outer surface curvatures.

References Cited in the file of this patent

UNITED STATES PATENTS

| | | |
|---|---|---|
| 1,180,341 | Thomas | Apr. 25, 1916 |
| 1,339,731 | Willson | May 11, 1920 |
| 2,008,530 | Wick | July 16, 1935 |
| 2,033,101 | Tillyer et al. | Mar. 3, 1936 |
| 2,341,673 | Walker | Feb. 15, 1944 |
| 2,511,329 | Craig | June 13, 1950 |

FOREIGN PATENTS

| | | |
|---|---|---|
| 207,794 | Switzerland | Feb. 16, 1940 |